(12) United States Patent
Devageorge et al.

(10) Patent No.: US 10,482,516 B2
(45) Date of Patent: Nov. 19, 2019

(54) METHODS AND SYSTEMS FOR GROUPING AND PRIORITIZATION OF CUSTOMERS FOR LIVE SUPPORT

(71) Applicant: Zoho Corporation Private Limited, Pleasanton, CA (US)

(72) Inventors: Jeri John Prabhu Devageorge, Kanyakumari (IN); Manikandan Vembu, Chennai (IN); Sudheer A. Grandhi, Pleasanton, CA (US)

(73) Assignee: Zoho Corporation Private Limited, Kancheepuram District (IN)

( * ) Notice: Subject to any disclaimer, the term of this patent is extended or adjusted under 35 U.S.C. 154(b) by 288 days.

(21) Appl. No.: 15/624,757

(22) Filed: Jun. 16, 2017

(65) Prior Publication Data

US 2017/0287039 A1    Oct. 5, 2017

Related U.S. Application Data

(63) Continuation of application No. 14/942,190, filed on Nov. 16, 2015, now Pat. No. 10,366,428.
(Continued)

(51) Int. Cl.
*G06Q 30/06*         (2012.01)
*H04L 29/08*         (2006.01)
(Continued)

(52) U.S. Cl.
CPC ..... *G06Q 30/0613* (2013.01); *H04L 41/5067* (2013.01); *H04L 67/02* (2013.01); *H04L 67/306* (2013.01); *H04W 4/21* (2018.02)

(58) Field of Classification Search
CPC . G06Q 30/0613; H04W 4/21; H04L 41/5067; H04L 67/02; H04L 67/306
(Continued)

(56) References Cited

U.S. PATENT DOCUMENTS 7,479,949 B2    1/2009  Jobs et al.
8,232,990 B2    7/2012  King et al.
(Continued)

FOREIGN PATENT DOCUMENTS

WO    2012125815 A2    9/2012

OTHER PUBLICATIONS

Anonymous, Business Evolution and Upstream Partner to Offer the Internet's First Live Voice-Enabled Customer Service Solution, Nov. 12, 1999, Business Wire, pp. 1-2. (Year: 1999).*
(Continued)

*Primary Examiner* — Jason B Dunham
*Assistant Examiner* — Brittany E Bargeon
(74) *Attorney, Agent, or Firm* — Arthur Behiel; Mark Lauer; Silicone Edge Law Group LLP

(57) ABSTRACT

A networked communication system allows a vendor that maintains a website to prioritize, select, and establish human-assisted interaction with customers interacting with the website or navigating a brick-and-mortar store. The system maintains databases populated with customer-specific data, including experiential information that reflects past and current customer activity. The vendor's human help agents are provided with intuitive interfaces that rank customers using agent-specific ranking rules applied to user data and experiential information. The databases are updated responsive to user activity. Agents can manage ranking rules to optimize their performance in responding to customers and thus improve customer experience.

15 Claims, 10 Drawing Sheets

Related U.S. Application Data

(60) Provisional application No. 62/081,528, filed on Nov. 18, 2014.

(51) Int. Cl.
*H04L 12/24* (2006.01)
*H04W 4/21* (2018.01)

(58) Field of Classification Search
USPC .................................................. 705/26.41
See application file for complete search history.

(56) References Cited

U.S. PATENT DOCUMENTS

| | | | |
|---|---|---|---|
| 8,514,221 | B2 | 8/2013 | King et al. |
| 8,645,872 | B2 | 2/2014 | Maxfield et al. |
| 8,766,928 | B2 | 7/2014 | Weeldreyer et al. |
| 2006/0026535 | A1 | 2/2006 | Hotelling et al. |
| 2007/0299964 | A1* | 12/2007 | Wong .............. G06Q 30/02 709/224 |
| 2010/0131835 | A1 | 5/2010 | Kumar et al. |
| 2010/0161540 | A1 | 6/2010 | Anisimov et al. |
| 2011/0264705 | A1 | 10/2011 | Diamond |
| 2012/0089950 | A1 | 4/2012 | Tseng |
| 2012/0266159 | A1 | 10/2012 | Risbood et al. |
| 2013/0080280 | A1* | 3/2013 | Scipioni .............. G06Q 10/06 705/26.1 |
| 2013/0227420 | A1 | 8/2013 | Pasquero et al. |
| 2014/0173530 | A1 | 6/2014 | Mesguich Havilio et al. |
| 2014/0196022 | A1 | 6/2014 | Skutin et al. |
| 2015/0032570 | A1* | 1/2015 | Alasaarela ......... G06Q 30/0613 705/26.41 |

OTHER PUBLICATIONS

Wroblewski, Touch Gesture Reference Guide, Apr. 19, 2010, web page printout.
ClickDesk, Live Chat, Video & VOIP, Helpdesk in one system, Aug. 6, 2014, web page printout.
Olark, Everything You Need to Make Customers Happy, Aug. 6, 2014, web page printout.
Olark, Targeted Chat, Aug. 6, 2014, web page printout.
Various contributors, Real user monitoring, (Wikipedia, Creative Commons), Sep. 9, 2014.
Google Support, Urchin Tracking Module (UTM), Sep. 17, 2015, web page printout.
AppsBuilder SpA, The All-in-One Tool, Nov. 15, 2015, web page printout.
SmartBear Software, Inc., AlertSite UXM What is Real-User Monitoring?, Sep. 9, 2014, web page printout.
Live Chat, For Customers—Chat Always available for your clients, Aug. 6, 2014, web page printout.
Zopim, Zopim Live Chat Features—Build Meaningful relationships, right on your website, Aug. 6, 2014, web site printout.
Guay, Matthew, Editorially—A Brilliant Markdown Collaborate Writing and Editing App, Jul. 19, 2013, web page printout.
Cholling, Charles C. et al., Natural language programming, (Wikipedia, Creative Commons), Nov. 24, 2014.
Viticci, Federico, Our Favorite Markdown Writing App for the iPhone, The Sweet Setup (Blanc Media, LLC), Feb. 4, 2015, web page printout.

* cited by examiner

Fig. 15

METHODS AND SYSTEMS FOR GROUPING AND PRIORITIZATION OF CUSTOMERS FOR LIVE SUPPORT

FIELD OF THE INVENTION

The present invention relates generally to e-commerce, and in particular to methods and systems for grouping and prioritization of website visitors for providing live, human-assisted support.

BACKGROUND

Websites offer many products and services to consumers. Millions of websites exist, and the number continues to grow. Because such a large number of websites is available, visitors have ready alternatives. Thus, many will simply abandon a website if the visitor experience seems unsatisfactory, and a potential sale is lost. As a consequence, website operators compete aggressively to attract and retain visitors, and further compete to convert website visits into sales.

A satisfactory visitor experience is more likely to result in a sale than an unsatisfactory one. Factors affecting the visitor experience occur in real time and may include questions regarding pricing, selection, product and service descriptions; and warranty, return, and shipping policies. Website navigability and responsiveness (performance) are also factors. Website performance may be influenced by the web browser or application used by the visitor, e.g., Google Chrome, Mozilla Firefox, Apple Safari, or by a mobile application. The platform on which the browser or application operates, e.g., a desktop or mobile device, may also influence performance. Similar issues exist with respect to navigating physical locations such as a store, and consumer interaction with email messages directed to consumers by a vendor.

Website operators have powerful incentives to enhance the visitor's experience by, e.g., engaging the visitor in real time with a human agent via, e.g., a written or oral conversation, or "live-chat." The task is daunting, however, because websites may attract tens of thousands of visitors at any given moment, and there are typically too few agents to serve every visitor. It is therefore necessary to provide information and tools to agents that enable them to rank, e.g., to prioritize and group, visitors, and to determine which visitor should be engaged first in a website, a physical site, or in a messaging environment. For example, a store having a suboptimal physical layout may nevertheless provide a satisfactory visitor experience, e.g., by helping the visitor expeditiously select a product and receive a discount, through agent assistance via, e.g., a smart phone. As with browsing in an electronic environment, e.g., a website, experiential data relating to physical activity, e.g., product interest based on location and time information, time spent in a store aisle, and time spent viewing a product, are collected with respect to a visitor browsing a physical environment.

BRIEF DESCRIPTION OF THE FIGURES

The present invention is illustrated by way of example, and not by way of limitation, in the figures of the accompanying drawings and in which like reference numerals refer to similar elements and in which:

FIG. 15 depicts a view 1500 for prioritizing visitors in accordance with one embodiment.

DETAILED DESCRIPTION

Figure 1:
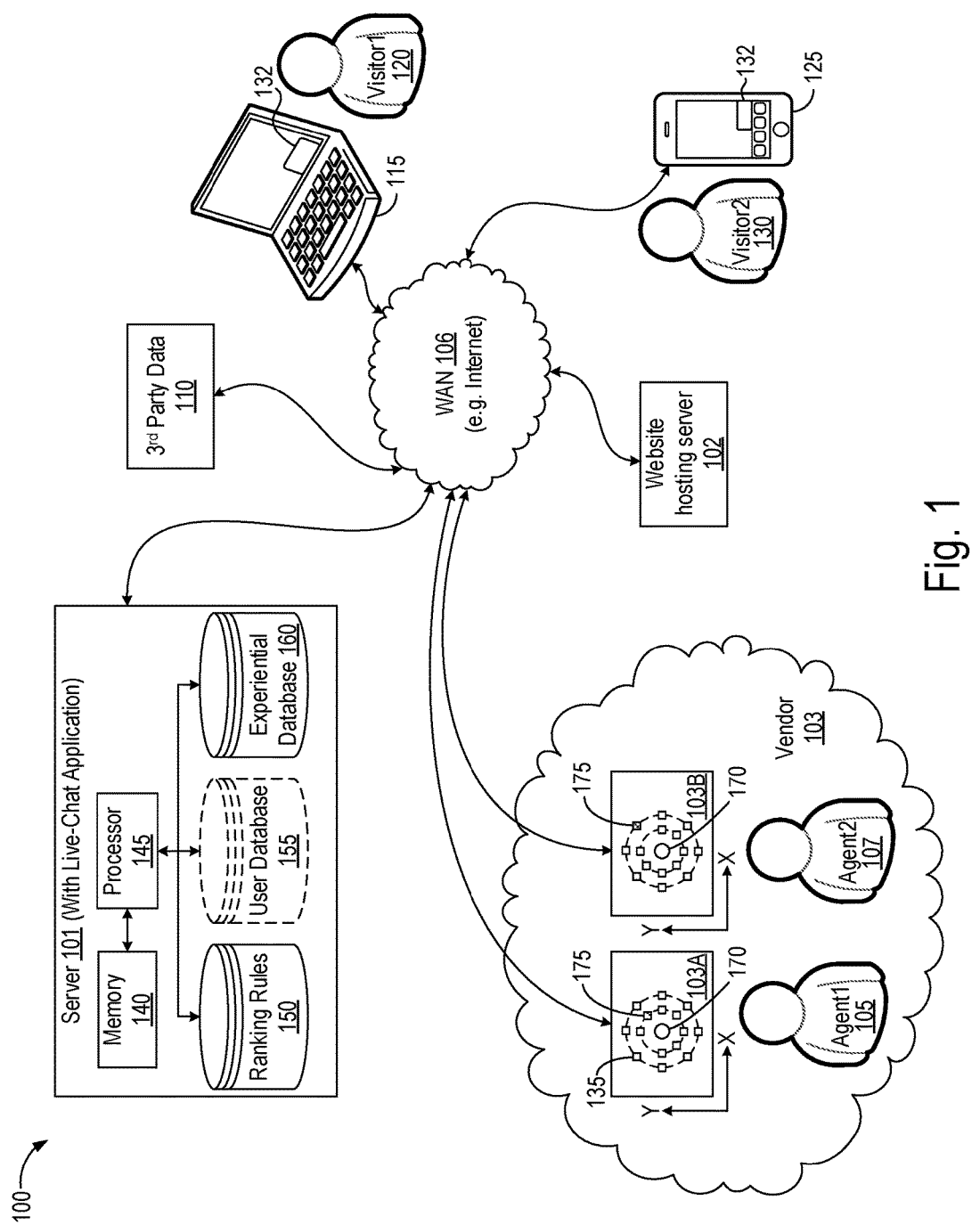
FIG. 1 depicts a networked communication system 100 that allows a vendor that maintains a website to prioritize, select, and establish human-assisted interaction with visitors to the website.

FIG. 1 depicts a networked communication system 100 that allows a vendor that maintains a website to prioritize, select, and establish human-assisted interaction with visitors to the website. Communication system 100 also allows a vendor to prioritize, select, and establish human-assisted interaction with visitors to a physical location (physical visitors), e.g., a store, and with email users, e.g., those to whom email messages have been directed by the vendor. For convenience, all such visitors are simply referred to as visitors. For further convenience, websites include websites and servers using or responsive to web beacons and may also include websites or servers receiving visitor experiential information, and may be hosted by a vendor, a third party, or a live-chat application. The experiential information is received by a sales-chat application such as Zoho SalesIQ provided by Zoho Corporation of Pleasanton, Calif. in one embodiment. The vendor's human help agents are provided with intuitive interfaces, e.g., one or more multidimensional vectors ("vectors") depicting visitor priority based on agent-specific ranking rules. Agents can manage these rules to optimize their performance in responding to visitors to a website, and thus improve the quality of visitors' experiences.

System 100 includes an application server 101 that supports a live-chat application, a website-hosting server 102, and a vendor 103 represented by user interfaces 103A and 103B. User interfaces 103A and 103B are rendered by client applications running on vendor computers and controlled by human agents 105 and 107 employed or contracted by the vendor (e.g., the entity who owns or otherwise controls the website of interest to the visitors). System 100 also includes a wide-area network (WAN) 106, e.g., the Internet, that facilitates communication with third-party data servers 110 and the client devices of website visitors, including a first client device 115 of a first visitor 120 and a second client device 125 of a second visitor 130.

Visitors 120 and 130 interact with webpages served by e.g. hosting server 102 on behalf of vendor 103. The webpages (not shown) include embedded scripts that communicate user activity to application server 101. While visitors 120 and 130 browse those pages, usage statistics reported to server 101 via the embedded scripts are used to prioritize agent response. Such usage statistics gauge visitor interest and time spent on a given page, for example. Server 101 prioritizes visitors and communicates visual representations of visitor priority to agents 105 and 107 via user interfaces 103A and 103B. In this example, interfaces 103A and 103B present agents 105 and 107 with icons 135, visual representations of visitors 120 and 130, on one or more concentric circles. The circles indicate visitor service priority, with smaller radii indicating higher priority in this example. Agents 105 and 107 can then select a relatively high-priority visitor—e.g. by a mouse click to an icon 135 on the smallest circle—to initiate live help.

Server 101 responds to an agent's selection of a visitor icon by initiating a pop-up window 132 on the selected visitor's client device 115 or 125. Window 132 inquires whether the visitor desires live text, audio, or visual support. Should a visitor interact with window 132 to answer in the affirmative, their client device conveys the visitor's response to application server 101, which then facilitates the requested support communication between the agent and selected visitor by e.g. exchanging required contact information or establishing a communication channel between the visitor and agent.

Server 101 also responds to one more communications it receives in response to a person opening an email message, typically a sales or marketing email sent by a vendor to a recipient, the email including one or more web beacons including a first tag data, e.g., a uniquely named link address, e.g., to an image on a server, e.g., server 101. The first tag data is recorded in a customer data record, thereby associating it with the recipient. A web beacon is an object embedded in an email message that requests content, e.g., the uniquely named link address. The request for content is typically made when the email message is opened by a user. The image may be practically invisible, e.g., a 1 pixel image, or larger. Upon receipt of a first communication, server 101 logs its contents. The information included in the first communication includes the first tag data and also includes first metadata, e.g., an internet protocol (IP) address of the device transmitting the communication, an operating system, e.g., Android 5, a browser version, and other device and user-identifying information.

Server 101 cross-references the first tag data with customer data, e.g., CRM, thereby identifying the recipient relating to the vendor's email. Once the recipient who opened the email is identified, server 101 prioritizes her as an email user (also an email visitor) in the same manner as it prioritizes a website visitor, and communicates a visual representation of the recipient's priority to agents 105 and 107 via user interfaces 103A and 103B, e.g., email user "Audra" (325) in Australia depicted on the outer circle of FIG. 3. Priority may be determined as with a website visitor based on experiential data as described more fully below with respect FIGS. 3-9, and with respect to status and elapsed time, e.g., email activity, relating to whether and when a particular message is "opened" or "not yet opened" by a recipient. For example, Audra (325) is on the outer circle of FIG. 3, indicating her message, sent 66 minutes and 32 seconds ago, is unopened. A flag, in one embodiment a lower case "e," identifies Audra as an email user. Email user Gina (330) is positioned on an inner circle, indicating her message was opened 10 minutes and 20 seconds ago. Email user Prue (335) from Australia is also on an inner circle, but farther clockwise than Gina, visually signaling that Prue's message was opened longer ago, i.e., a greater elapsed time at 53:27, than Gina's message (10:20). The agent may therefore easily determine at a glance whether to give higher priority to Gina or Prue. The agent may communicate with Prue (335) via follow-up email, for example by "dragging and dropping" a coupon offer onto icon 335. The agent may similarly communicate with Audra (325) and Gina (330).

Servers 101 and 102 can include an e-commerce website (not shown) with a database containing product and service offerings. Each of devices 115 and 125, and the clients supporting agent interfaces 103A and 103B, may be, e.g., a desktop computer, a laptop computer, a mobile device, or a smart phone, and any may be physical or virtual. Application server 101 includes memory 140, a processor 145, a ranking rules database 150, a user database 155 containing a list of users and user-specific data, and an experiential database 160. Experiential database 160 may be embodied, e.g., in one or more of a local or remote database, browser cookies, or xml files. User database 155 can be used to prioritize visitors to a website, also email users, and visitors to a physical location such as a store, but need not be part of server 101. In other embodiments user database 155 is managed by vendor 103 e.g. on hosting server 102 or third-party data server 110.

Server 101 may be embodied in a single physical server, or in a multiplicity of collocated or physically separate physical or virtual components, interconnected over a local-area network (LAN), wide-area network (WAN), or in a cloud-computing environment. All or any portion of the live-chat or live-help software may be self-hosted or hosted by a third party. Efficiencies, costs, and the ability to scale may be factors determining which configuration to adopt. For example, website hosting, live-chat applications, customer relationship management ("CRM") applications, and productivity applications, e.g., document processing, may be provided as cloud services. Communication among various components may be via wired or wireless technology. Typically, software application platforms, e.g., "Live Desk" and CRM applications provided by Zoho Corporation, are hosted on application servers. The application servers may utilize database storage for storing application related data, e.g., ranking rules, user data and experiential information. Websites and computing services, whether self-hosted or in a cloud, may be accessed via computing and communication devices, e.g., desktop computers, laptop computers, mobile devices, smart phones, and tablets, by website visitors. Similarly, the agents and renderings (between agents 105 and 107 and server 101) may, with respect to servers or one another, be co-located, physically separate, and accessible via, e.g., a LAN or WAN.

Figure 2:
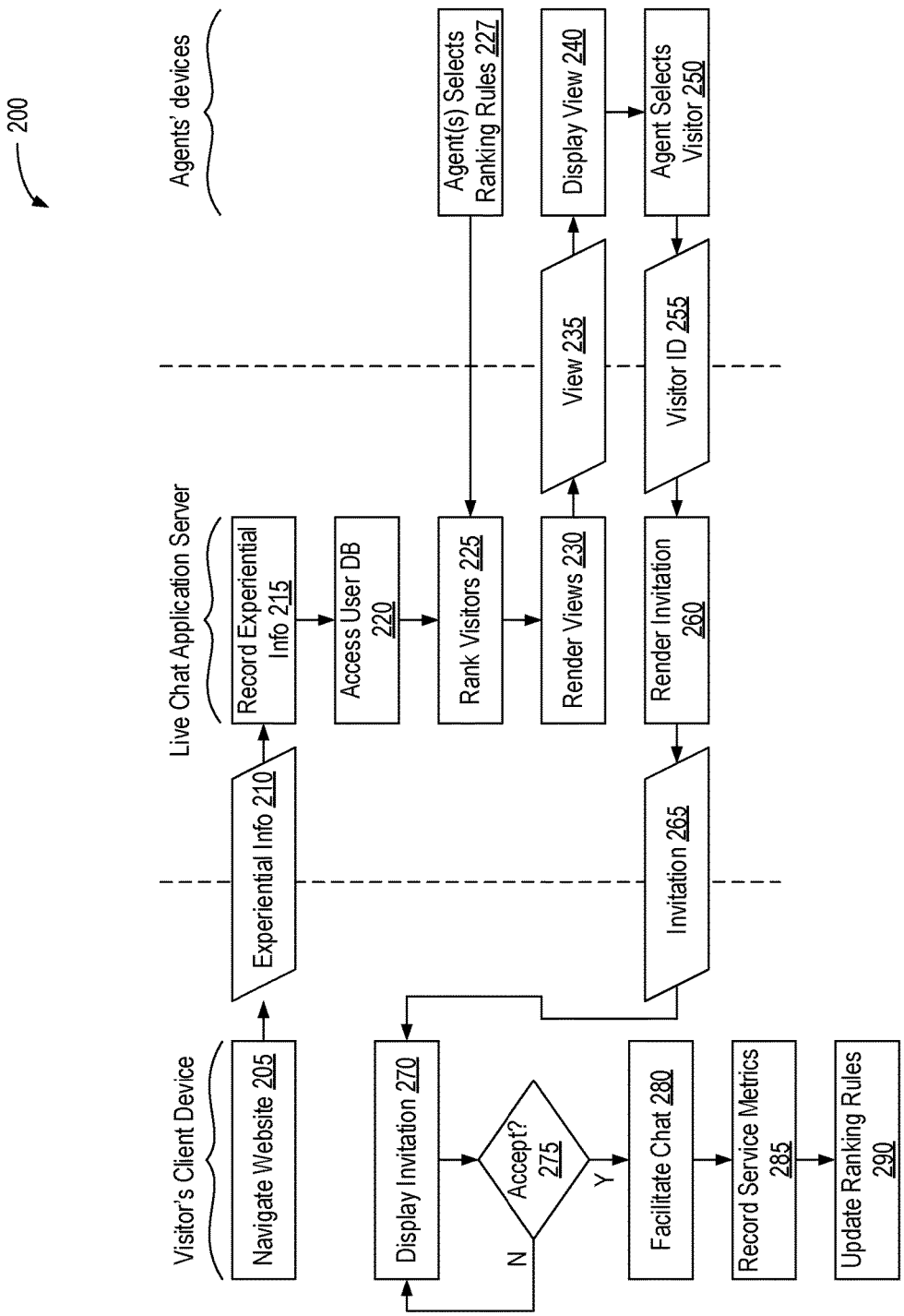
FIG. 2 is a flowchart 200 depicting a method for ranking, e.g., grouping and prioritizing, visitors to a website using the example of FIG. 1.

FIG. 2 is a flowchart 200 depicting a method for ranking, e.g., grouping and prioritizing, visitors to a website using the example of FIG. 1. To begin (step 205), visitors 120 and 130 use their respective client devices 115 and 125 to navigate a website on hosting server 102. The website might be a travel site, for example, with options that might overwhelm would-be purchasers. As visitors 120 and 130 peruse the site, scripts embedded in the web pages report experiential information 210 to application server 101, which records this information in experiential database 160. Experiential data can include e.g. the time visitors spent on a site, browsing selections, IP address, and browser type. Experiential data might also track the current visitor interaction, such as to detect potential visitor dissatisfaction (e.g., did the visitor make it partially through a purchase and pause or start over?). Experiential information 210 may be recorded in, e.g., one or any of a formal database, browser cookies, or xml files (step 215). Monitoring visitors' website experiences allows agents 105 and 107 to determine whether visitors are being served quickly and efficiently, and to detect errors and bottlenecks. Such feedback could move a visitor ahead in a live-chat queue.

Application server 101 may maintain or have access to user database 155, which can include additional visitor information useful in prioritizing agent interventions. If a visitor can be identified, server 101 accesses database 155 (step 220) to obtain any personal data that can be useful in prioritizing visitors for heightened or better targeted interaction. For example, personal identity details may be accessed from user database 155, e.g., a CRM database, which may be self-hosted or hosted by a third party. The visitor experience may be recorded in an experiential database, e.g., one or any of a formal database, browser cookies, or XML files, to obtain information relating to, e.g., time spent on website pages, navigation history, and search behavior. User and experiential databases may be updated in real time during visitor visits, or may be updated separately by, e.g., the agent or website operator. Such information about website visitors may provide insight to agents and website operators relating to products or services that may be of interest to website visitors, and may also provide critical feedback concerning the design and layout of a website or mobile application. Other metrics might relate to prior purchases, amounts purchased, credit history, effectiveness of prior live-chat sessions, text or voice preference, language preference, or interest in a particular product or service.

The method employed by server 101 ranks visitors 120 and 130 responsive to experiential information 210 and any corresponding user information from database 155 (step 225). This ranking is based on ranking rules contained within rules database 150 (FIG. 1). The ranking rules are not fixed, nor are they the same for each of agents 105 and 107. Rather, each agent can select their one set of ranking rules (step 227), and can update them as desired. Agents can therefore experiment to find the set of ranking criteria that works best. For example, agent 105 may find that a bias in favor of Spanish-speakers who prefer text interaction allows him or her to improve sales, whereas agent 107 performs better with visitors who prefer spoken English. Agents may be provided a default rule set, or may step through an initial set-up process to establish a custom set. Feedback indicative of the success or failure of other agents may also be used to modify rule sets, or to suggest such modifications. Agents or their supervisors can then actively modify their rule sets in an effort to improve agent or visitor interaction and experience.

Whatever the rules and data, the ranking of step 225 prioritizes interactive assistance for each agent, e.g., agents 105 and 107 of FIG. 1 and renders agent-specific views 235 (step 230) for user interfaces 103A and 103B. These views 235 are conveyed as e.g. web pages that depict the rankings of step 225 individually or in priority groups along one or more priority axes. In step 240, user interfaces 103A and 103B display views 235 that depict the rankings of step 225. Returning to the example of FIG. 1, user interfaces 103A and 103B illustrate visitor priority relative to a central reference point 170. Visitors are depicted as square icons arranged in concentric rings surrounding point 170, with those rings closer to reference point 170 connoting higher priority. Visitor priority is thus clearly evident to agents 105 and 107 as a distance from point 170. One of the visitor icons 175 is shaded to identify visitor 120, and to show that the rankings employed to render the views for interfaces 103A and 103B give visitor 120 a lower priority for agent 107 than for agent 105. Priority information is distributed across both the X and Y axes of interfaces 103A and 103B so agents receive visitor-priority feedback in two spatial dimensions, more generally, multiple spatial dimensions. This simple, intuitive interface allows agents to select an appropriate visitor to communicate with, and to effectively make other informed decisions in real-time. Other embodiments render three-dimensional icons to depict additional priority information along a Z axis.

Returning to FIG. 2, an agent selects one of the visitor icons (e.g., icon 175) via the respective user interface (step 250). The client computer supporting the agent's user interface conveys the visitor ID 255 of the selected icon to application server 101. Responsive to visitor ID 255, application server 101 sends an invitation 265 to the client device associated with the agent's selected visitor (e.g., device 125 for visitor 130) inviting the visitor to communicate with the agent. For example, the visitor's client displays a "live-chat" window offering live text, voice, or video support (step 270). In another embodiment visitors that reach a specified priority level are automatically invited to communicate with an available agent, possibly overriding the agent's preferred rules.

If the visitor accepts the invitation (decision 275), the application server facilitates the communication offered via the invitation (step 280). The communication facilitated in step 280 may be, e.g., written or voice chat, email, or telephone. The method records service metrics 285 that may be used, e.g., to gauge agent effectiveness, and updates ranking rules 290 to reflect, e.g., the status of the visitor. Returning to 227, ranking rules may also be updated by a given agent at any time. The method may be practiced simultaneously with respect to a multiplicity of, e.g., first and second agents, visitors, rankings, renderings, views, communications, and updates. For example, first and second agents may simultaneously view respective first and second rankings or simultaneously update ranking rules. Agents may therefore be incentivized by the website operator or live-chat service provider to compete for effective visitor service. Service metrics may be recorded and used by the website operator to gauge the efficacy of agents' strategies, to reward agents, and to apply particularly effective strategies to other agents.

The recording of visitor experiential information to, e.g., the experiential information database, browser cookies, and directly to an agent application, e.g., Live Desk, may be enabled for a given website by embedding a script, e.g. some JavaScript code, in some or all pages of the website. For mobile devices, JavaScript code or an Application Programming Interface (API) may be used within a mobile application. The code provides real-time tracking of visitor experiential information, e.g., visitor interaction with the elements of the website such as images, video, links, icons, forms and webpages. Further examples include mouse-over (hovering) actions, mouse-clicks, URL accesses, and icon activations on, e.g., a touch screen interface. Web browser or mobile application characteristics such as version number and device IP address may also be recorded. Website visitors may be new or returning. Associating a visitor with e.g., a user database, aids in the ranking by providing historical information concerning visitors such as the number of prior visits.

Figure 3:
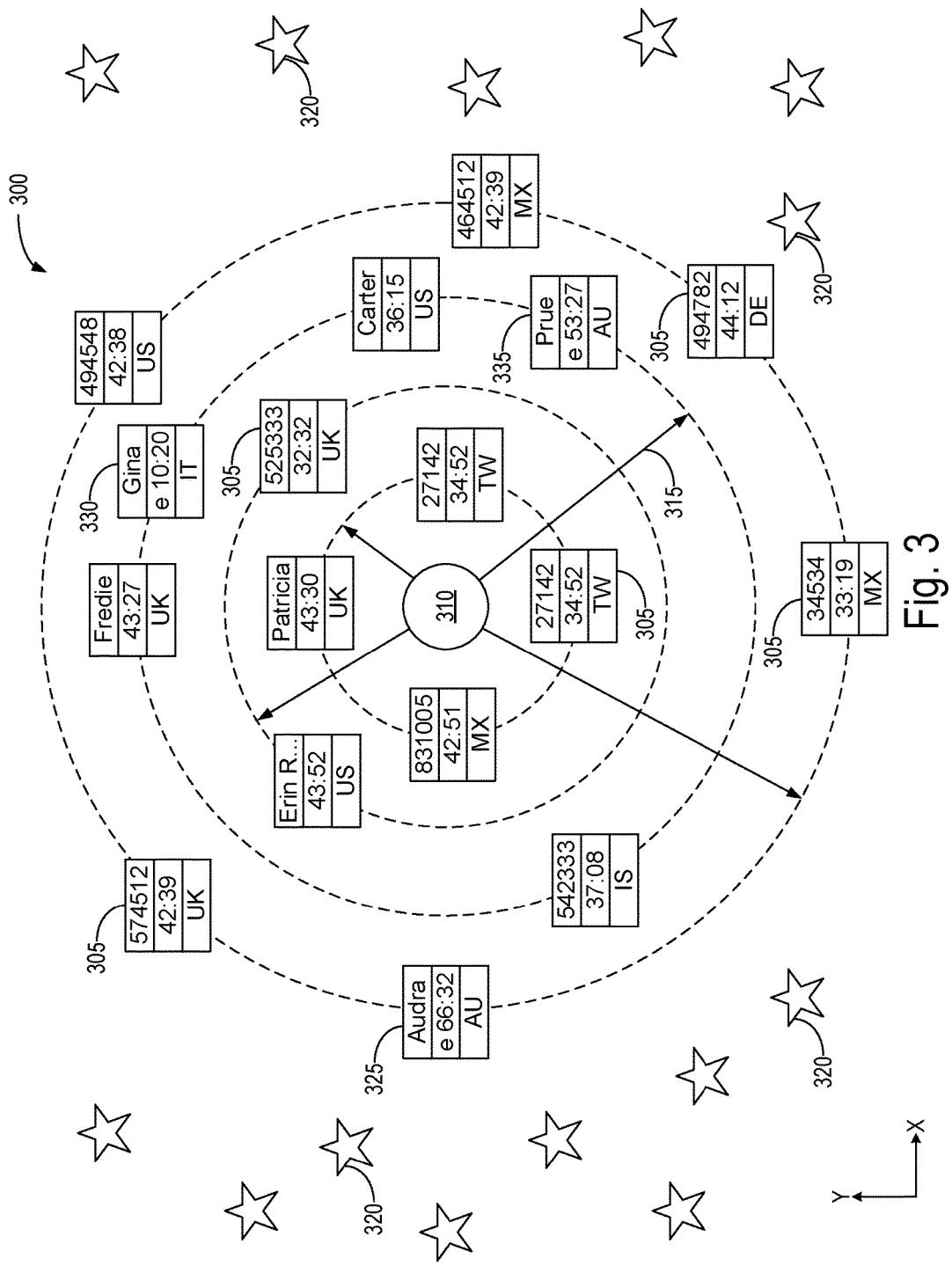
FIG. 3 depicts an agent's view 300 in accordance with an embodiment that depicts service priority by placing visitor icons 305 at discrete distances from a reference location 310 at or near the center.

FIG. 3 depicts an agent's view 300 in accordance with an embodiment that depicts service priority by placing visitor icons 305 at discrete distances from a reference location 310 at or near the center. The agent's view may be accessed from within a CRM application, e.g., via a separate tab corresponding to the view, or via a native application. Visitor icons 305 are collected into nested, concentric proximity groups, one for each priority distance 315. In this example, each priority distance is a radius, and each icon 305 includes a name field, populated by a number if the name is unknown, a time-on-site field, and a country field. Agents can customize the number and contents of these fields in some embodiments. For example, one agent may prefer a language field over a country field, while another might prefer a country field only if language is unspecified for a given visitor. Each of a constellation of star icons 320 represents a visitor for which there is insufficient room on the outer priority grouping, or that has an assigned priority that is insufficient to merit ranking, or that does not satisfy any ranking criteria.

Icons 305 and 320 may convey information different from what is shown here, or may convey the same information differently. For example, region or nationality could be conveyed using flags colored to correspond to each visitor's country of origin. The icon, when activated, may display a window with more detailed visitor information and a menu of optional actions, e.g., to initiate a text, audio, video, or telephonic live-chat session with the visitor or to send the visitor an email. An image of the agent or other agent-identifying information may be placed at the center of the circle and conveyed to visitors awaiting or involved in a live-help (e.g. live-chat) session. A mouse-over action by the agent on a circle of a given radius displays the criteria associated with the corresponding visitor or visitor group.

To motivate agents, examples of other information to include at the center of the circle or elsewhere include: (1) a performance target for the agent (2) current active live-chat sessions (3) and a recent agent performance score/rating. This information may be shared with other agents to entice them to increase their performance score/rating.

In one embodiment the display of a group on the graphical interface may be collapsed or otherwise reformatted with a pre-defined input on the interface (e.g. activation of a special icon for that purpose placed at a convenient place on the circle) from the vendor or agent. A collapsed circle may be displayed as an icon so that the agent may activate it to expand it back into view. A collapsed circle may be expanded back to the regular display of the circle with a corresponding pre-defined input from the agent (e.g. activation of an icon for that purpose). This allows agents to temporarily hide one or more groups in the display to tailor the display to suit their needs.

Default rules and criteria are provided in case no visitor priority order is configured for a given vendor or agent. In a variation of this embodiment the end-users within a group may be categorized further into sub-groups depicted based on a specification or configuration defined or selected by the website owner or agent(s). In one example a sub-group may be depicted with a special or distinguishing color or shape. In another example the sub-group may be displayed in a manner that spatially distinguishes it on the display (in the case of a circle display for the group, the sub-group may occupy a portion of the circle corresponding to a sector of the circle associated with that sub-group).

In another embodiment more than one set of concentric circles may be configured and rendered with each set corresponding to a separate grouping and prioritization of visitors. This allows different dimensions of criteria to be tracked separately. For example one set may deal primarily with product categories and another set may deal primarily with geographical locations. This would allow the website owner or agent to take appropriate actions based on the grouping and prioritization in each set separately. In a variation of this embodiment each set may be displayed under a separate tab and the tab may be selected to view the corresponding set.

In another embodiment, visitor priority and dimensions of criteria represent physical activities in a traditional, e.g., "brick and mortar" store, analogous to website browsing. A vendor provides location-based services, e.g., one or more of Bluetooth, Wi-Fi, Geo-Fencing, magnetometers, and accelerometers, which in conjunction with an application on a client device, e.g., a smart phone, provide real-time data corresponding to a potential customer's browsing within the store. A server or the website receives experiential data from the client device in accordance with one embodiment. One dimension, e.g., radius 315, represents time spent by the potential customer, or in-store prospect, in a location. A concentric ring represents the location, e.g., an aisle or region of a store, or a product or product category within the location. Position along the concentric ring, a second dimension, indicates duration in the location, e.g., farther along clockwise indicates longer duration. An in-store sales representative (agent) may receive an alert and take appropriate action, e.g., by offering to help the prospect, including offering a coupon. An agent not in the store may also offer a coupon, e.g., for a product discount, to visitors prioritized on the inner circle depicted in FIG. 3 by "dragging and dropping" a coupon onto the circle. Alternatively, the agent may offer a coupon to individual visitors, e.g., "Patricia" and "525333," by respectively "dragging and dropping" a coupon onto each visitor. The agent may do so individually, or may highlight and select "Patricia" and "525333" as a group, and drop the coupon into the group.

In another aspect, radius 315 represents priority, and placement of an in-store prospect on a concentric circle includes factors similar to those considered in the context of a website visitor, e.g., time spent visiting a particular location or with particular categories of products, or an amount of potential sales revenue. Moreover, in the context of a brick-and-mortar store, a retailer's desire to move inventory—particularly if a prospect is showing interest in products relating to that inventory—is an additional factor in determining priority.

In another aspect, helpful information or a coupon is automatically, e.g., via an intelligent trigger, transmitted to the client device, e.g., via the application. The intelligent trigger may be effectuated by a customized script, e.g., via Javascript API, or natively executable by the application or a web browser. For example, a coupon personalized to the prospect in a particular shopping scenario, e.g., while in an aisle near products of interest, e.g., cosmetics, groceries, appliances, or in the case of a website visitor, while on a certain page displaying products of interest, may be displayed in the application or in a web browser. The customized script may be customized manually by an agent, or may be customized automatically, e.g., programmatically, in real time, in a context involving customer data, e.g., a CRM system taking into account prospect history, e.g., browsing, total spend, product interests, demographic information, and other factors. Other factors may include a brick-and-mortar's need to move stale inventory, thus a special offer may be advantageously offered automatically "on-the-spot" to a prospect showing interest in product corresponding to the stale inventory. Other factors may include recognizing that the in-store prospect is in a competitor's store, and sending an enticing real-time offer to the prospect to win the prospect's business. The intelligent trigger is similarly developed and deployed in the context of website visitors, and may be triggered by an agent in a live-chat application, or automatically in response to visitor activity.

Figure 4:
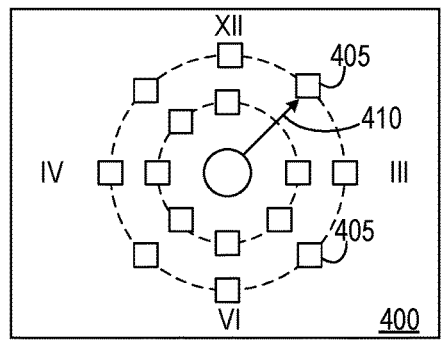
FIG. 4 depicts an exemplary view 400 for depicting visitor priority.

FIG. 4 depicts an exemplary view 400 for depicting visitor priority. Like view 300 of FIG. 3, visitor icons 405 are collected into nested, concentric proximity groups, with higher-priority icons closer to the center. Unlike view 300, however, view 400 is organized like a clock face and priority is displayed as a function of both distance and angle with respect to the center reference. In this example, each icon 405 in a given ring is additionally ranked using a priority angle, with later "times" indicative of greater priorities. Priority for a given icon 405 can thus be defined by a priority distance 410, which may be depicted in the view or imagined by the agent.

Figure 5:
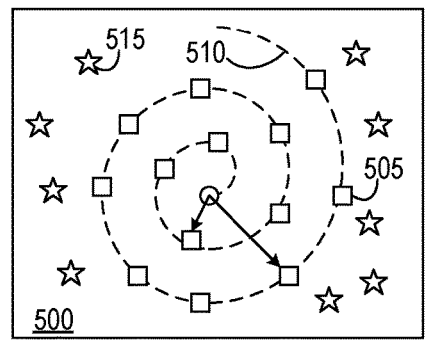
FIG. 5 depicts an exemplary view 500 for depicting visitor priority in accordance with another embodiment.

FIG. 5 depicts an exemplary view 500 for depicting visitor priority in accordance with another embodiment. In this example, visitor icons 505 follow a spiral path 510, gaining priority as they approach the center reference. Distance and angle are both used to convey the sense of priority. Icons 505 need not follow or remain on the path, as visitor icons 505 can move about based on e.g. the applied rules and learned experiential data, or can be removed from path 510 should the visitor move away from the website or be helped by another agent. In general, an agent provided view 500 would tend to select icons 505 near the center to initiate live visitor interaction. Stars 515 represent visitors that, while active on the website, are not yet on spiral path 510.

Figure 6:
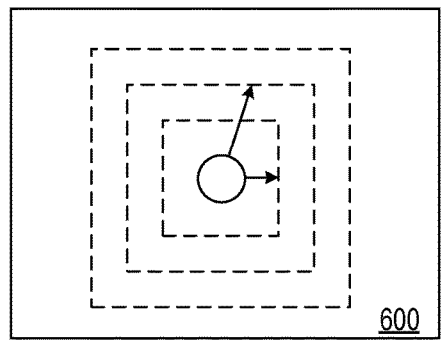
FIG. 6 depicts a view 600 for depicting visitor priority in accordance with another embodiment.

FIG. 6 depicts a view 600 for depicting visitor priority in accordance with another embodiment. Visitor icons, not shown, are collected into a pattern of concentric rectangles rather than circles. Other shapes are possible, as will be readily apparent to those of skill in the art.

Figure 7:
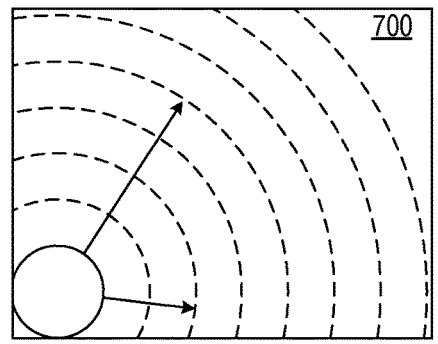
FIG. 7 depicts yet another view 700 for depicting visitor priority.

FIG. 7 depicts yet another view 700 for depicting visitor priority. Visitor icons, not shown, are collected into a pattern of arcs about a reference toward one corner of the view, with priority expressed by distance from the reference, angle, or both.

Figure 8:
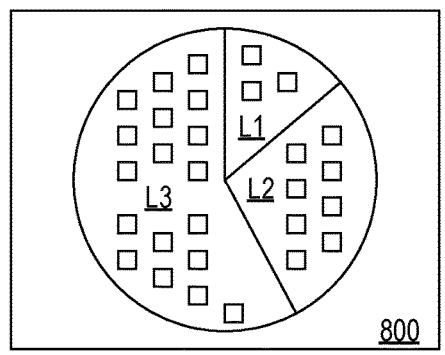
FIG. 8 depicts yet another view 800 for depicting visitor priority.

FIG. 8 depicts yet another view 800 for depicting visitor priority. Visitor icons, shown as squares, are displayed in a pie chart with three priority levels L1, L2, and L3. Priority can be expressed by e.g. the size and/or placement of the pie slices. For example the pie slice/sector may be ranked by position based on an angle measured at the center of the pie. Each visitor icon in a pie slice/sector may be additionally ranked based on distance from the center of the pie.

Figure 9:
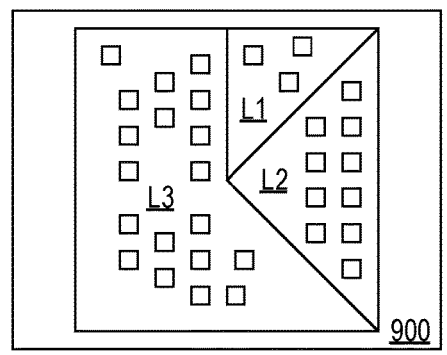
FIG. 9 depicts yet another view 900 for depicting visitor priority.

FIG. 9 depicts yet another view 900 for depicting visitor priority. Visitor icons, shown as squares, are displayed in a chart with three priority levels L1, L2, and L3. Priority can be expressed by e.g. the size and/or placement of the pie slices. For example the pie slice/sector may be ranked by position based on an angle measured at the center of the pie. Each visitor icon in a pie slice/sector may be additionally ranked based on distance from the center of the pie.

Views are not limited to the types illustrated above. Variations of rendering, e.g., discs, ellipses, polygons, and other shapes may be placed in any configuration suitable for depicting priority, e.g., in a sequence adjacent to one another in order of increasing or decreasing size, or by employing color to signal priority. Graphics for rendering include, e.g., bar charts, columns, and tables. In another embodiment, rendering of a group may be collapsed by activating, e.g., a special icon located on the circle to simplify the display. The circle may be re-rendered by activating the icon again. Agents may be provided a menu for easily switching between views.

The icon representing a website visitor may also have a call-out box showing some end-user information such as name or identifier number. The icon when activated may display a window with more detailed end-user information and a menu of options to take actions (such as starting a text live-chat session, audio live-chat session, video live-chat session, phone session, or sending an email etc.). The smaller the circle the higher priority the corresponding group of end-users has as per the Website owner or agent. A picture of the agent or other information identifying the agent may be included at the center of the circle. A mouse-over action by the agent on the circle displays the criteria associated with the corresponding end-user group. The end-users that do not satisfy any of the group criteria set by the agent or equivalently do not fall into any of the groups may be shown as stars outside/beyond the concentric circles.

In one embodiment the display of a group on the graphical interface may be collapsed with a pre-defined input on the interface (e.g. activation of a special icon for that purpose which may be placed at a convenient place on the circle) from the Website owner or agent. A collapsed circle may be displayed as an icon so that the Website owner or agent may activate it to expand it back into view. So a collapsed circle may be expanded back to the regular display of the circle with a corresponding pre-defined input from the Website owner or agent (e.g. activation of an icon for that purpose). This allows a Website owner or agent to temporarily hide one or more groups in the display to tailor the display to suit their needs.

In one embodiment the end-users within a group may be displayed in an order or sequence as specified or configured by the Website owner or Agent. For example the end-users may be displayed in a clock-wise order (on a circle display for the group) based on an ordering index such as name, identifier number and potential value as stored in a CRM database. If no order is configured or specified for displaying end-users within a group, default ordering rules or criteria may be used such as time spent on the web site. In a variation of this embodiment the end-users within a group may be categorized further into sub-groups and depicted as sub-groups based on specification or configuration by the Website owner or Agent. In one example a sub-group may be depicted with a special or distinguishing color. In another example the sub-group may be displayed in a manner that spatially distinguishes it on the display (in the case of a circle display for the group, the sub-group may occupy a portion of the circle corresponding to a sector of the circle associated with that sub-group).

data items listed below. The left column lists criteria for grouping visitors, while the right column provides descriptions for the criteria. Each row corresponds to a group, and the row order corresponds to the priority of the group.

| Grouping Criteria: | Description |
| --- | --- |
| Browser: | Browser used by the visitor in the website. |
| Country: | Country of the visitor accessing the website. |
| Current page: | Uniform Resource Locator (URL) of the page where the visitor is accessing. |
| Current page title: | Title of the page where the visitor is accessing. |
| Campaign Source: | An Urchin Tracking Module (UTM) is used to identify a search engine, newsletter name, or other source. A UTM is a tracking code that can be attached to a custom URL to track e.g. a source, medium, and campaign name. The use of UTM tracking codes is well understood by those of skill in the art. |
| Campaign Medium: | UTM used to identify a medium such as email or cost-per-click. |
| Campaign Term: | UTM used for paid search e.g.: keywords for the ad. |
| Campaign Content: | UTM used for testing and content-targeted ads. |
| Campaign Name: | UTM used for keyword analysis to identify a specific product promotion or strategic campaign. |
| Department: | Department in the live-chat widget of the website. |
| Google Click Identifier: | A globally unique tracking parameter (GCLID) used by Google to pass information between Google AdWords and Google Analytics. |
| IP address: | IP address of the visitor visiting the website. |
| Landing page: | URL of the page where the visitor has landed in the website. |
| Landing page title: | Title of the page where the visitor landed in the website. |
| Number of past live-chats: | Count on number of past live-chats with the visitor. |
| Number of URLs accessed: | Count on number of URLs visited by the visitor. |
| Number of visits: | Count on number of visit by the visitor in the website. |
| Operating System: | Operating system used by the visitor. |
| Referrer: | Source from where the visitor is referred. |
| Region: | Region of the visitor in the website. |
| Search engine: | Search engine used by the visitor. |
| System status: | Status provided by the system for the visitor. |
| Time since last action: | Time since last action performed by the visitor in the website. |
| Time on site: | Time spent by the visitor in the website. |
| Visitor availability: | Visitors availability in the website. |
| Visitor Info: | Visitor name, email etc. set using, e.g., JavaScript APIs and displayed to agent |
| Web Embed: | Embed (e.g. live-chat widget) in the website where the visitor is accessing. |

In one embodiment more than one set of concentric circles may be configured and rendered with each set corresponding to a separate grouping and prioritization of end-users. This allows different dimensions of criteria to be tracked separately. For example one set may deal primarily with product categories and another set may deal primarily with geographical locations. This would allow the website owner or agent to take appropriate actions based on the grouping and prioritization in each set separately. In a variation of this embodiment each set may be displayed under a separate tab and the tab may be selected to view the corresponding set. Third, fourth, and other sets of priority axes may be similarly rendered as, e.g., sets of concentric circles, allowing the agent, and other agents, to take appropriate real-time actions. For ease of visualization, the concentric circles (corresponding to priority axes) may be tabbed on agents' displays for easy selection.

Figure 10:
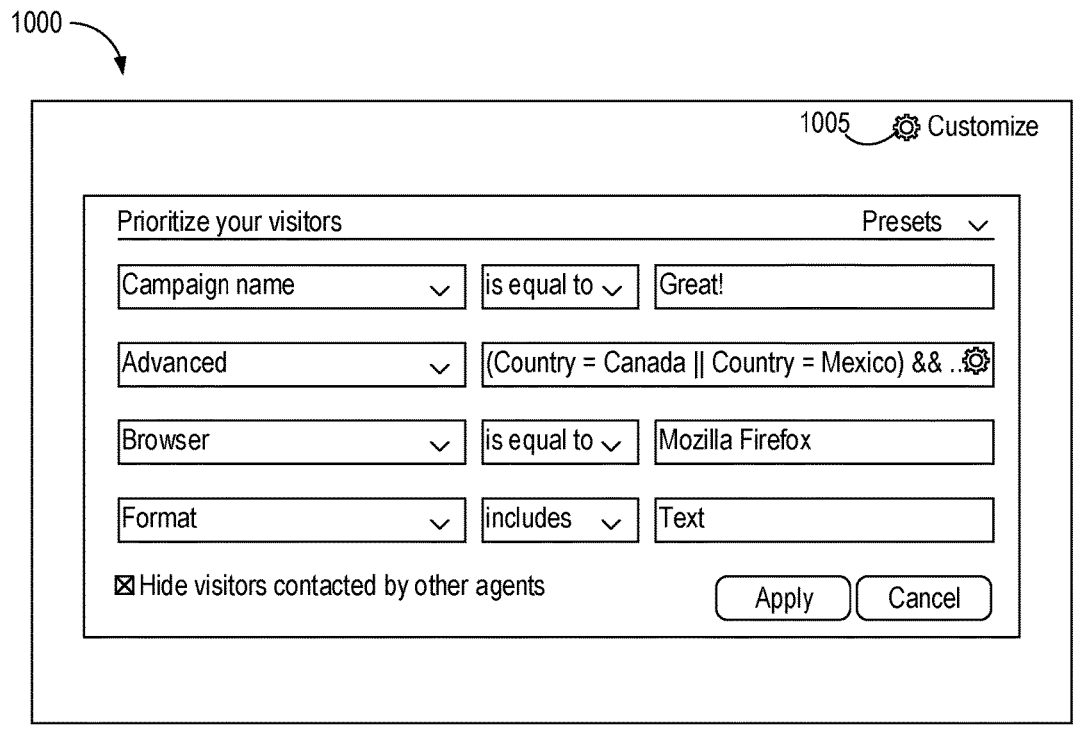
FIG. 10 depicts a screen shot 1000 of a user interface that allows an agent to customize his or her visitor-ranking rule set.

FIG. 10 depicts a screen shot 1000 of a user interface that allows an agent to customize his or her visitor-ranking rule set. The interface may be activated by selecting a "customize" icon similar to icon 1005 from within a dashboard display of a live-chat application. Selection criteria may be stored in any or a combination of, e.g., ranking, user, and experiential databases 150, 155, and 160 and may include In the rows depicted in FIG. 10, the first field corresponds to a criteria, e.g. "Browser type," the second field corresponds a condition (e.g., "is equal to," "not equal to", "between", "is greater than", "is lesser than", "begins with", "ends with" or "contains") and the third field corresponds to a value, e.g., "Mozilla Firefox." Other criteria can be used.

In one embodiment the information/data gathered from the grouping and prioritization of visitors (for example in a live-chat application platform) is shared with another Application Platform, such as a CRM Application platform or other third-party Application platform. For example a CRM database in a CRM Application platform may be updated with information obtained from end-user tracking based on at least one of grouping criteria and prioritization criteria. The CRM database may be maintained for example by the owner of the visited website or a third party.

Various types of scripts can be embedded into visitor webpages to initiate and facilitate live-chat, and to otherwise enhance visitor experience. In this context, a "script" is software code that can be installed and executed within a web page by an entity or vendor that maintains a website. One way this may be achieved is with an Application Programming Interface (API) between the live-chat application and the other application to provide for communication of relevant information.

Figure 11:
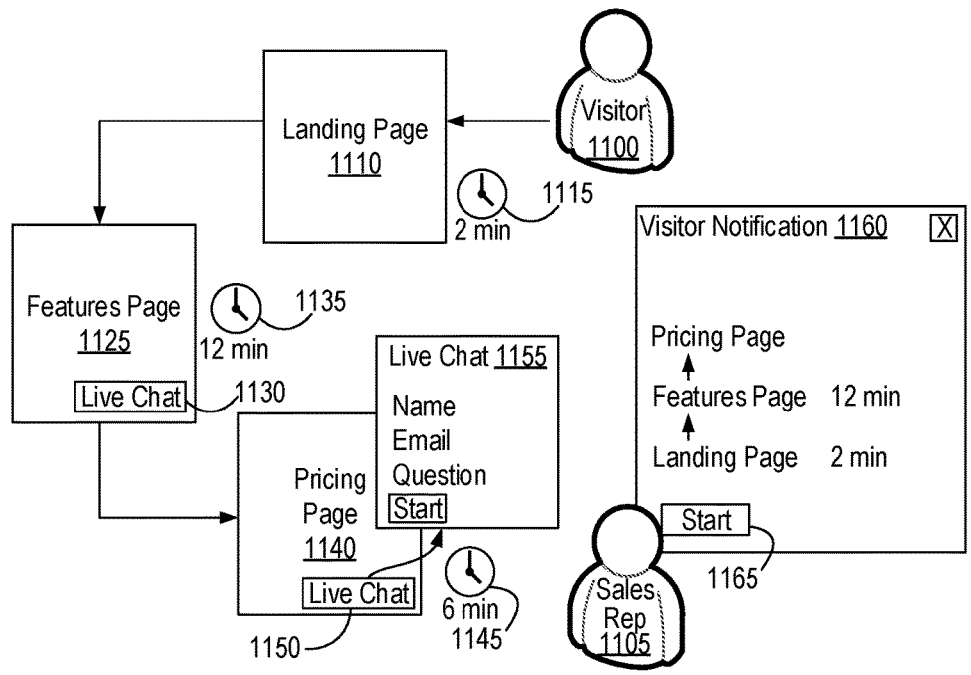
FIG. 11 graphically depicts interaction between a visitor 1100 and a sales representative 1105 using a flow of simplified webpages.

FIG. 11 graphically depicts interaction between a visitor 1100 and a sales representative 1105 using a flow of simplified webpages. Sales representative 1105 can be a live-chat agent like agent 105 of FIG. 1, a salesperson with access to a CRM database, or both. In some embodiments a live-chat agent supports visitors in the manner detailed above, and live-chat support can be handed off to, or otherwise taken over by, a separate sales representative.

Visitor 1100 begins with a landing page 1110, such as a home page, that provides a listing of products or services. A time script 1115, which may not be visible to visitor 1100, reports the time spent on page 1110 to sales representative 1105. Visitor 1100 proceeds to a features page 1125 to learn more about an item presented in page 1110. Page 1125 offers both additional details of potential interest to the visitor and a link 1130 to facilitate a live-chat session should visitor 1100 be interested in such interaction. A time script 1135 reports the time spent on page 1125 to sales representative 1105. Link 1130 can be part of a script that presents link 1130 to the user e.g. after a certain time, or when representative 1105 has the time and inclination to ask whether visitor 1100 is in need of assistance. Representative 1105 can prioritize help using the principles detailed above.

In the example of FIG. 11, visitor 1100 is sufficiently interested in some item or feature that he or she moves to a pricing page 1140. A time script 1145 tracks the time on this page, after a specified period presenting a link 1150 prompting visitor 1100 to engage in a live-chat session. Should visitor 1100 elect to participate by selecting link 1150, a window 1155 can prompt visitor 1100 for information that may be of use to representative 1105. Visitor 1100 initiates the live-chat session by selecting "Start." Script 1145 also reports the time elapsed since visitor 1100 began considering pricing page 1140, information that can help representative 1105 prioritize visitor 1100 and gauge visitor frustration and interest. During the live-chat session, representative 1105 can e.g. answer questions and otherwise support visitor 1100.

Data collected in a live-chat application may be communicated to other applications, such as CRM application or a Support Application. For example, the live-chat application may include an Application Programming Interface (API) to convey visitor data to a CRM application. A tab or other feature can be added to the CRM user interface to convey details relating to visits and visitors. The CRM application could, for example, capture and report visitors' IP addresses, pages visited and by whom, time spent on each page by each visitor, past live-chats, actions performed in the web page, etc. The data collected can be associated with the corresponding leads or contacts in the CRM database to aid the sales representative in servicing the visitor during the current visit or some later time.

Integrating live-chat and CRM systems can support customers and sales by alerting sales representatives of the existence and needs of visitors using live-chat-session and CRM data. Assume, for example, that sales representative 1105 is a salesperson interacting with the user interface of a CRM application. The CRM user interface can present representative 1105 with a visitor-notification page 1160 alerting representative 1105 of the contemporaneous activity of visitor 1100 and reporting data relevant to the browsing experience of visitor 1100. The CRM application can present representative 1105 with other information, e.g., as depicted in visitor tracking views 1400, 1500, and 1600, separately or integrated with visitor-notification page 1160, about e.g. visitor 1100 and products or services potentially of interest to help representative 1105 assist the visitor. Sales representative 1105 can then select a start button 1165 to initiate a live-chat session, or otherwise establish communication with visitor 1160. Such actions can be reported back to the live-chat application to alert the agents that the visitor is being served.

Sales representatives with access to visitors' presence and experience data can receive a "popup" or other notification whenever a visitor browses a relevant website. If required, such notifications can be disabled, or filters can be put in place to manage the number of notifications. For example, a sales representative may establish a filter rule in which he or she will be notified of a visitor only if the visitor meets specified criteria.

A CRM application in accordance with one embodiment sorts visitors into categories for representative notification. This categorization can be done based visitor identity, which may be gleaned from the name and/or email address provided by the visitor. Category 1 is "customers": the visitor identity matches one of the CRM contacts. Category 2 is "customers with potentials in pipeline": the visitor identity matches an open potential in the CRM database. Category 3 is "New Visitors": the visitor does not match any record saved in the CRM database.

A CRM module (e.g., a lead/contacts module) can be updated to include visitor 1100 as a lead, and the live-chat transcript and other relevant information can be stored for later reference. A partial list of potentially relevant information includes a visitor's IP Address, pages visited; time and duration on each page or a subset of pages of interest; topics, participants, and transcripts of live-chat sessions; actions performed on web pages; and the identity of a referring person, business, or website. Such relevant information may also be collected and stored for existing contacts/customers as well, and can infuse meaning into subsequent live-chat sessions by e.g. relaying requirements to save visitor 1100 and representative 1105 (or another representative) time. Integrating live-chat with CRM can thus improve visitor experience and sales revenue.

In another embodiment the rendering of the interface for grouping and prioritization discussed herein for a live-chat application may be included in other software applications such as a CRM application or a Support Application. One way this may be achieved is with an Application Programming Interface (API) between the live-chat application and the other Application to provide for communication of relevant information. In another approach the user interfaces for grouping and prioritization of visitors may be included inside the other application (e.g. CRM application or Support application).

In another embodiment the grouping and prioritization may be applied to customers/clients within an application (e.g. CRM) that is independent of the live-chat application and the associated user interfaces for grouping and prioritization may be implemented within the application (e.g. CRM). Customers/clients of the CRM application may or may not be website visitors, as grouping and prioritization can be independent of visitor tracking and live-chat applications). The grouping and prioritization criteria may be specific to the CRM application and associated criteria that are specific to the CRM application. For example in a CRM application the customers are categorized/grouped typically into leads, potential customers, and customers depending on the stage of relationship or engagement. Some embodiments depict visitor priority levels for live-chat using this or similar categorizations. Another example may be grouping customers/leads who emailed/mailed the agent in a specified time period. An agent of the CRM application may configure/control the way the grouping and prioritization of customers/clients is done by using the associated user interfaces.

Figure 12:
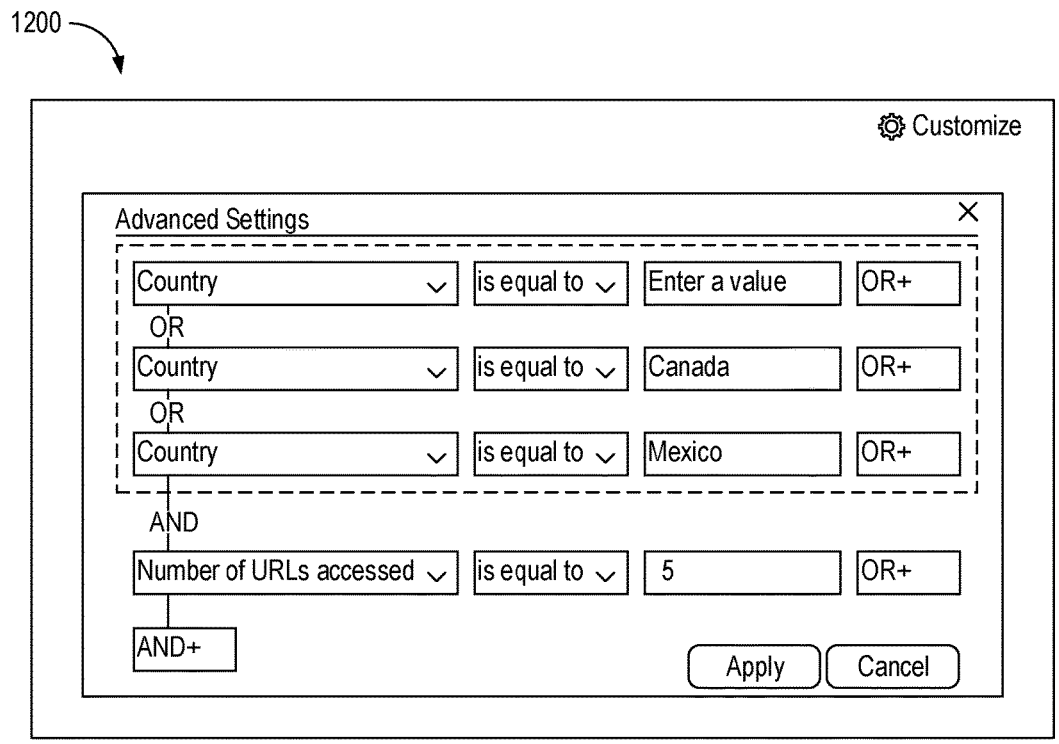
FIG. 12 depicts a user interface 1200 that allows users to adjust certain advanced settings discussed in connection with FIG. 8.

FIG. 12 depicts a user interface 1200 that allows users to adjust certain advanced settings discussed in connection with FIG. 10. Rows of the interface depicted in FIG. 10 can include an "advanced" configuration selection, which when selected presents the agent with the user interface 1200 to enable advanced configuration for the corresponding row in the interface of FIG. 10. As in the example of FIG. 10, user interface 1200 includes rows containing criteria, condition, and selection fields. The interface of FIG. 12 allows rows to be logically combined, e.g. using OR and AND logic, to provide an advanced configuration for the corresponding row in the interface of FIG. 10. Essentially the advanced configuration allows or enables a combination of two or more criteria for a group (corresponding to a row in the interface of FIG. 10). In FIG. 12 a combination of criteria is chosen: Country may be either Canada OR Mexico, AND the number of URLs accessed by the end-user should be equal to 5. A skilled artisan will readily appreciate that other combinations involving logically combined criteria may also be employed to achieve varying degrees of customization.

Information and data gathered from the grouping and prioritization (ranking) of visitors, e.g., in a live-chat application such as Live Desk, may be shared with, e.g., a CRM application platform or other third party application via, e.g., an API. For example, a CRM database may be updated with visitor experiential information based on grouping and prioritization criteria.

In some embodiments visitor data can flow from a CRM database to a live-chat application. As in prior examples, the CRM database can be hosted by the same website operator as supports the live-chat application or a third party. Exemplary CRM data that may be of use for initiating or engaging in live-chat sessions are as follows: (1) CRM Contact: Contact information of website visitors as stored in CRM; (2) CRM Lead: Lead information of website visitors as stored in CRM; and (3) CRM Potential: Potential value of website visitors as stored in CRM. Such criteria, when made available to the live-chat application, can be used to group visitors in the manner detailed previously. For example, the variable "CRM Potential," based e.g. on a visitor's prior spending habits or credit score, can be considered in depicting visitor priority.

Figure 13:
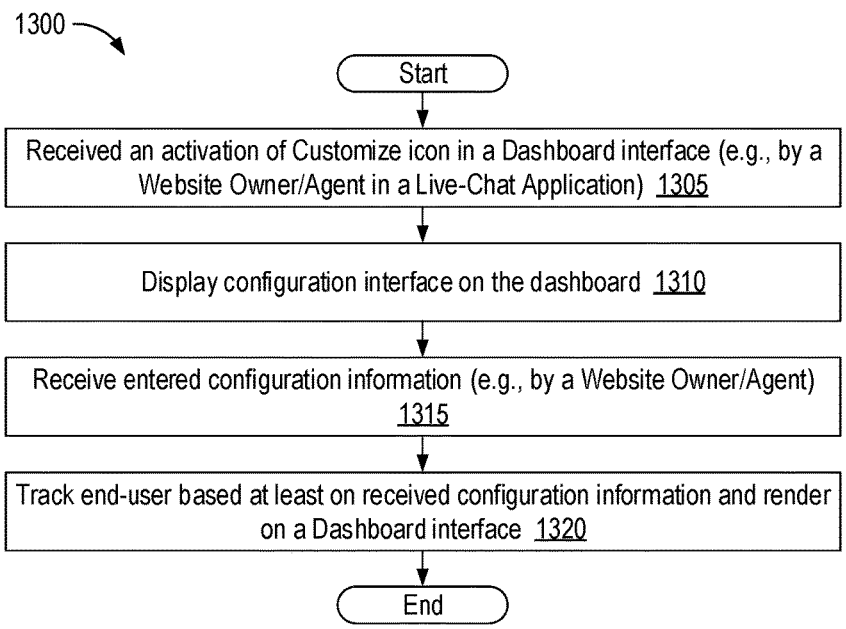
FIG. 13 depicts a flow diagram 1300 for configuring and rendering views of visitor and visitor-group priority in accordance with one embodiment.

FIG. 13 depicts a flow diagram 1300 for configuring and rendering visitor and visitor-group priority in accordance with one embodiment. The procedure begins with receiving an activation of a "customize" icon in a dashboard interface by, e.g., an agent in a live-chat application (1305). As a result of that configuration, an interface is displayed to receive configuration information for grouping and prioritizing visitors (1310). On receiving configuration information (1315), tracking of visitors based at least on configuration information is conducted and rendered on the dashboard interface (1320).

Figure 14:
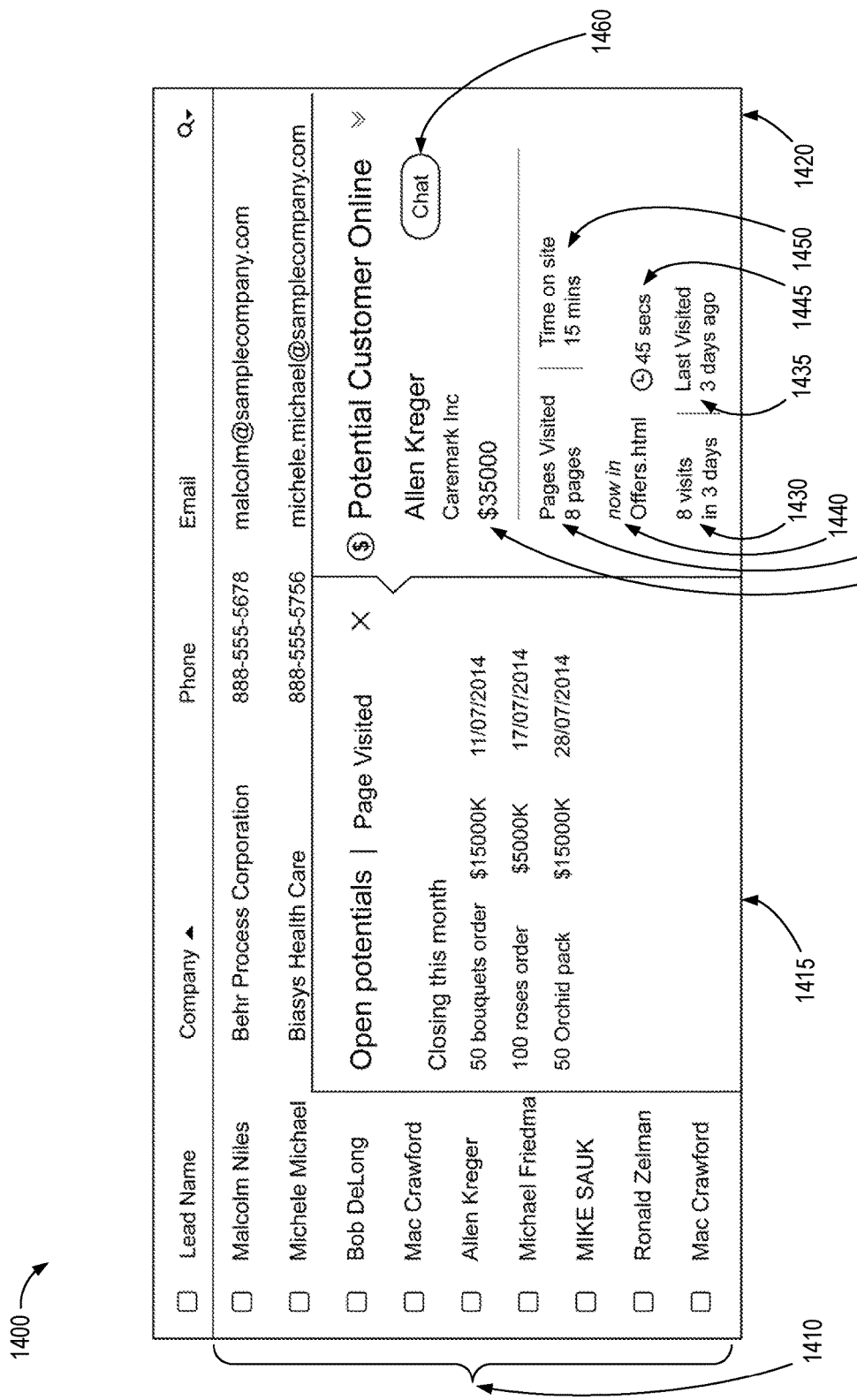
FIG. 14 depicts a view 1400 for identifying visitors in accordance with one embodiment.

FIG. 14 depicts a visitor tracking view 1400 enabling a user, e.g., sales representative 1105, to identify website visitors and view visitor metrics. Visitor tracking view 1400 may be initiated within a CRM application in response to an alert that a visitor, e.g., visitor 1100, a potential or existing customer, is browsing a website. Visitor tracking view 1400 may be presented in a standalone window as shown, and may also be integrated in a visitor-notification window, e.g., visitor-notification page 1160 discussed with respect to FIG. 11. Visitor tracking view 1400 presents information from a CRM application to sales representative, e.g., sales representative 1105, including a list of leads or potential customers 1410, more particularly, Lead (visitor) Name, Company, Phone, and Email address. Other visitor and related information may be displayed as will be readily apparent to those of skill in the art. In the example of tracking view 1400, sales representative 1105 is presented with a notification of a visitor (Alan Kreger, fifth position in leads list 1410) currently on line, displaying an open potentials window 1415 and a notification window 1420.

Open potentials window 1415 and notification window 1420 indicate visitor Kreger is indeed ready to make a purchase. Window 1415 depicts three (3) pending orders ("Closing this month") totaling USD 35,000. Notification window 1420 ("Potential Customer Online") indicates visitor Kreger has USD 35,000 pending (1425), and has made eight (8) visits to the website in three (3) days (1430), most recently three (3) days ago (1435). Visitor Kreger moreover is on-site now, viewing "Offers.html" (1440) for the past 45 seconds (1445), and has been "on site" for fifteen (15) minutes (1450) visiting eight (8) pages (1455). Sales representative 1105 accordingly may elect to chat (1460) with visitor Kreger to further assist and close a sale. Note that an appropriately named web page, here, "Offers.html," advantageously signals to a user, e.g., sales representative 1105, that a visitor appears likely to make a purchase. Other appropriately named pages may be deployed throughout a website as will be readily apparent to those of skill in the art.

Figure 15:
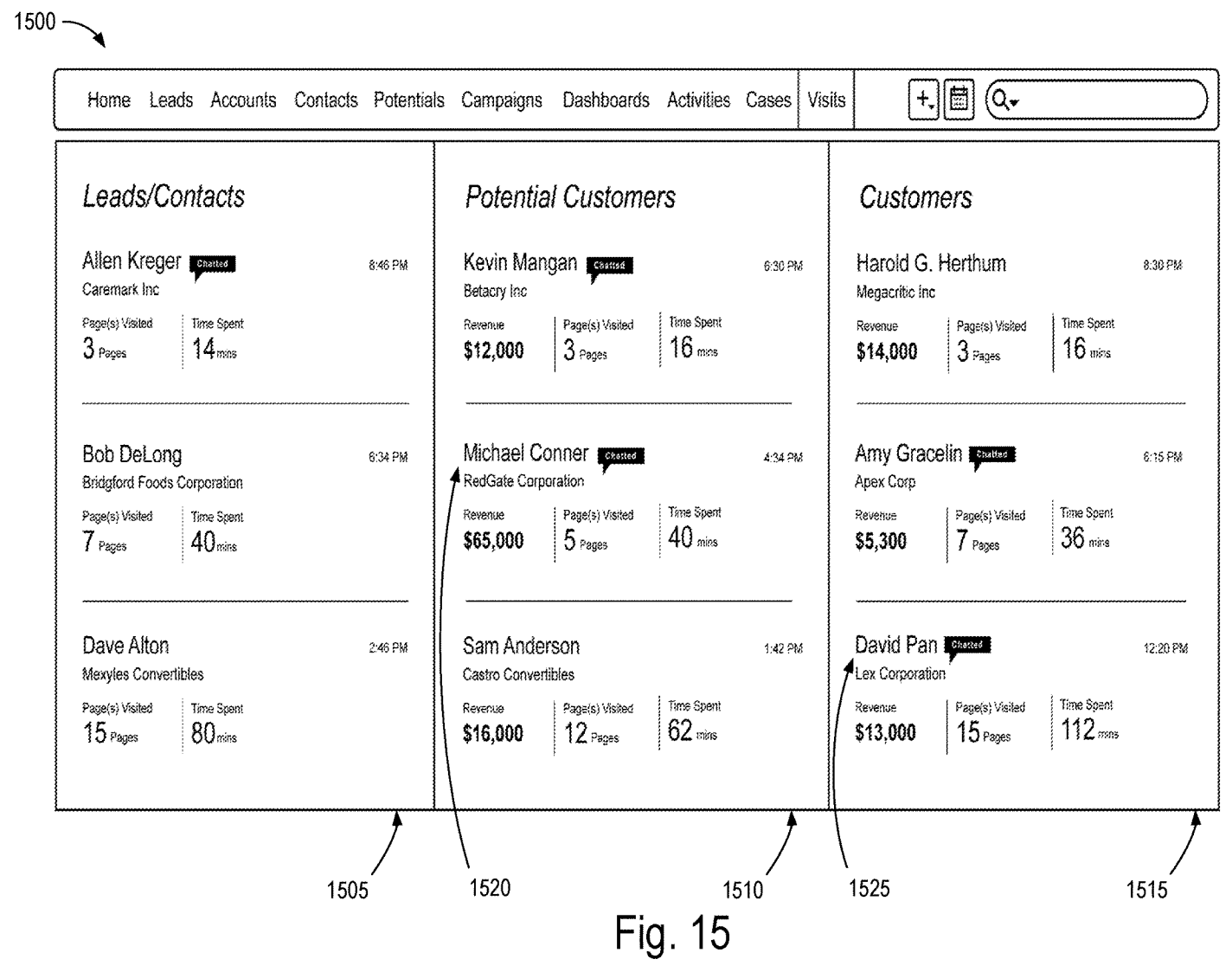

FIG. 15 depicts a visitor tracking view 1500, which categorizes visitors for a user, e.g., sales representative 1105, to prioritize visitors. As visitors browse a website, a CRM application collects data relating to visitor activities, including those described with respect to FIG. 14. In the example of FIG. 15, visitor tracking view 15 depicts a segmented view of website visitors, enabling a user, e.g., sales representative 1105, to prioritize visitors for follow-up activities. Column 1505 identifies "Leads/Contacts," representing visitors in an early shopping phase relative to a purchase. Notably, none of the visitors depicted in column "Leads/Contacts" column 1505 has an identified dollar amount. Column 1510 identifies "Potential Customers" including prospective dollar amounts for each of three (3) visitors, Mangan (USD 12,000), Conner (USD 65,000), and Anderson (USD 16,000). A user, e.g., sales representative 1105, may elect to focus on visitor "Michael Conner" because he represents the largest potential sale. In response to activating (1520 Michael Conner's record by, e.g., mouse-clicking or pressing a touch-sensitive screen, the CRM application provides a visitor tracking view 1600 including details relating to visitor Conner's browsing, chat and transcript history, described more fully with respect to FIG. 16 below. Returning to visitor tracking view 1500 and FIG. 15, "Customers" column 1515 identifies three (3) visitors, Herthum (USD 14,000), Gracelin (USD 5,300), and Pan (USD 13,000), who are customers, meaning each has purchased at least once. A sales representative may notice that customer "David Pan" has browsed considerably more pages (15) and for more minutes (112) than visitors Herthum (2/14) and Gracelin (7/36), indicating Pan may benefit from assistance. The sales representative may therefore elect to activate (1525) Pan's record to reveal his browsing history and begin providing assistance.

Figure 16:
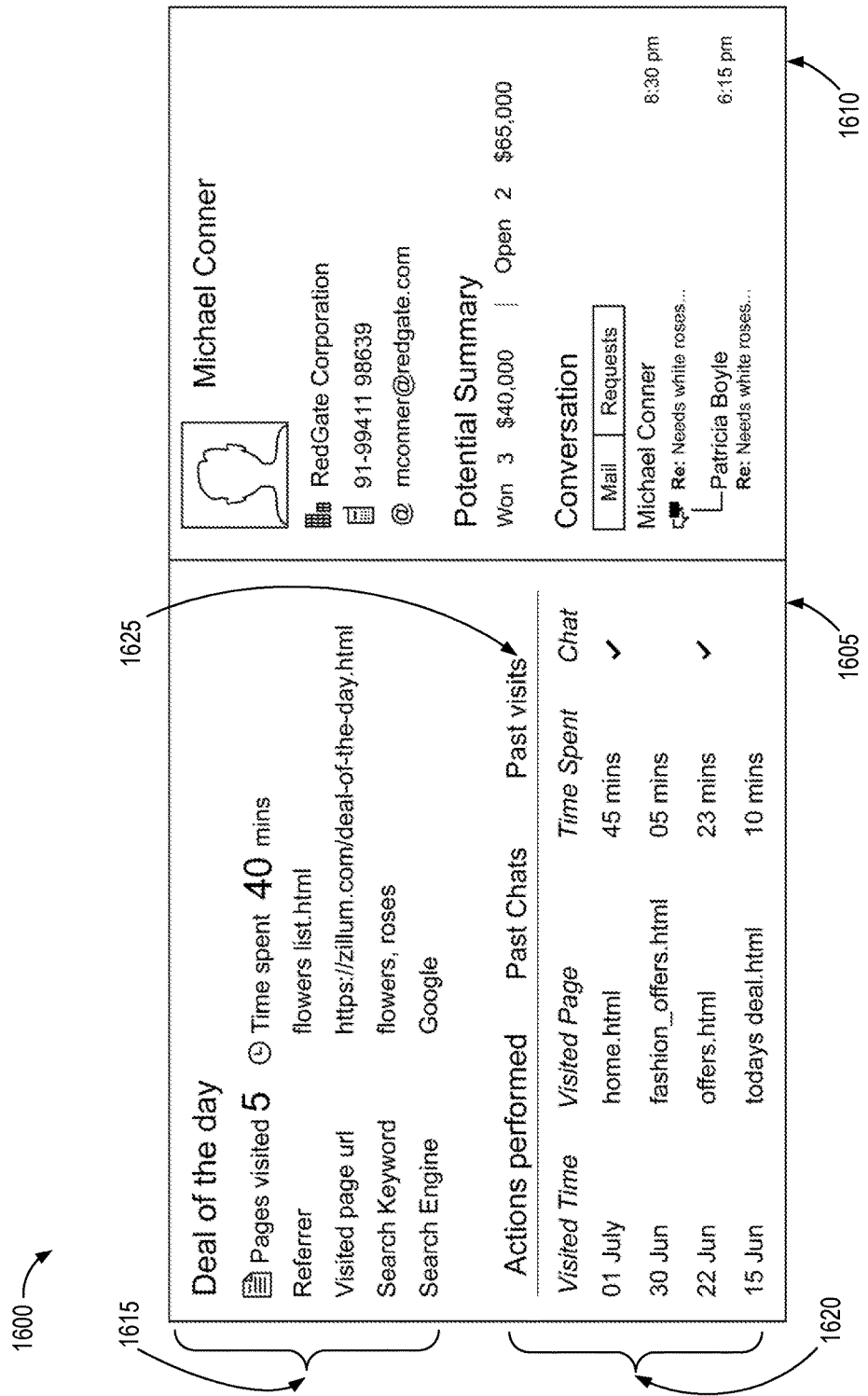
FIG. 16 depicts a view 1600 for monitoring visitors in accordance with one embodiment.

FIG. 16 depicts a visitor tracking view 1600 enabling a user, e.g., sales representative 1105, to monitor visitors and access visitor activity history. In the example of FIG. 16 a CRM application provides details in column 1605 corresponding to visitor "Michael Conner," including "Deal of the day" information and a list of activities selectable among "Actions performed," "Past chats," and "Past visits." A sales representative may therefore advantageously ascertain a visitor's (Conner's) navigation path, e.g., "flowers list.html" referred from "https://zillium.com/deal-of-the-day.html" and "Time spent," here, 5 pages visited in 40 minutes (1615). The sales representative selects "Past visits" 1625 to reveal that Conner visited various web pages on July 1, June 30, June 22, and June 15 for durations respectively of 45, 05, 23, and 10 minutes (1620). A check mark adjacent to each visit indicates whether a "Chat" occurred during the visit. Column 1610 depicts Conner's "Contact" information (company, phone, email), "Potential Summary" (3 orders won for USD 40,000, 2 orders open for USD 65,000), and "Conversation" (mail/requests) history (1610). Based on visitor tracking view 1600, a sales representative may gain insights into Conner's interests and therefore increase her likelihood of converting Conner's browsing activities into a sale.

Figure 17:
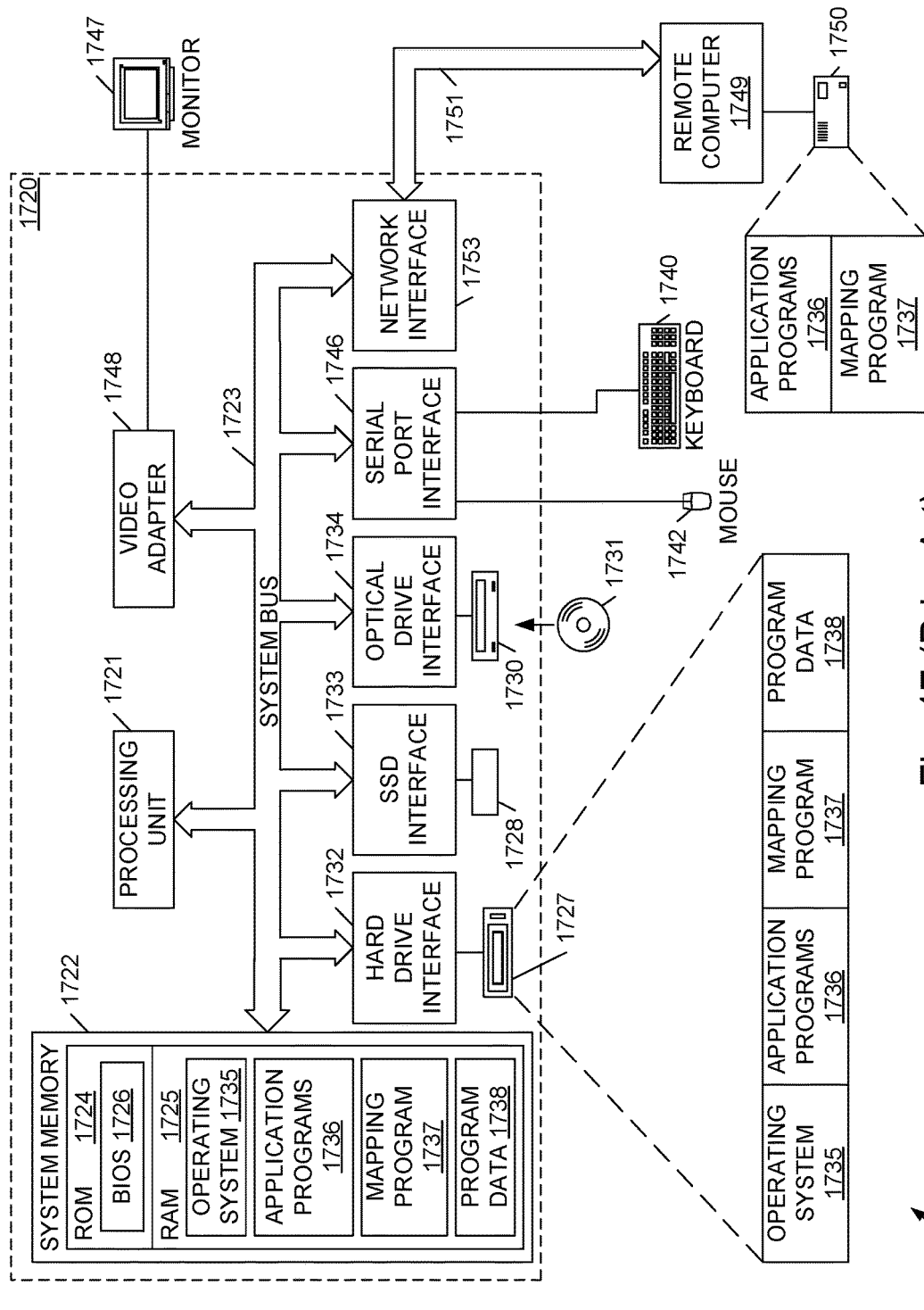
FIG. 17 depicts a suitable prior art computing environment 1700 in which the invention may be implemented.

FIG. 17 and the following discussion are intended to provide a brief, general description of a suitable computing environment in which the invention may be implemented. The foregoing examples are described in the general context of computer-executable instructions, such as program modules, executed on client and server computers linked through a communication network, including the Internet. Generally, program modules include routines, programs, objects, components, data structures, etc., that perform particular tasks or implement particular abstract data types. In a distributed computing environment, program modules may be located in both local and remote memory storage devices, and may be executed by client and server computers.

FIG. 17 depicts a general-purpose computing system 1700 that can serve as a client or a server depending on the program modules and components included. One or more computers of the type depicted in computing system 1700 can be configured to perform operations described with respect to FIGS. 1-13. Those skilled in the art will appreciate that the invention may be practiced using other system configurations, including hand-held devices, multiprocessor systems, microprocessor-based or programmable consumer electronics, network PCs, minicomputers, mainframe computers, and the like.

Computing system 1700 includes a conventional computer 1720, including a processing unit 1721, a system memory 1722, and a system bus 1723 that couples various system components including the system memory to the processing unit 1721. The system bus 1723 may be any of several types of bus structures, including a memory bus or memory controller, a peripheral bus, and a local bus using any of a variety of bus architectures. The system memory includes read only memory (ROM) 1724 and random access memory (RAM) 1725. A basic input/output system 1726 (BIOS), containing the basic routines that help to transfer information between elements within the computer 1720, such as during start-up, is stored in ROM 1724. The computer 1720 further includes a hard disk drive 1727 for reading from and writing to a hard disk, not shown, a solid-state drive 1728 (e.g. NAND flash memory), and an optical disk drive 1730 for reading from or writing to an optical disk 1731 (e.g., a CD or DVD). The hard disk drive 1727 and optical disk drive 1730 are connected to the system bus 1723 by a hard disk drive interface 1732 and an optical drive interface 1734, respectively. The drives and their associated computer-readable media provide nonvolatile storage of computer readable instructions, data structures, program modules and other data for computer 1720. Other types of computer-readable media can be used.

A number of program modules may be stored on the hard disk, solid state disk 1728, optical disk 1731, ROM 1724 or RAM 1725, including an operating system 1735, one or more application programs 1736, other program modules 1737, and program data 1738. A user may enter commands and information into the computer 1720 through input devices such as a keyboard 1740 and pointing device 1742. Other input devices (not shown) may include a microphone, joystick, game pad, satellite dish, scanner, or the like. These and other input devices are often connected to the processing unit 1721 through a serial port interface 1746 that is coupled to the system bus, but may be connected by other interfaces, such as a parallel port, game port or a universal serial bus (USB). A monitor 1747 or other type of display device is also connected to the system bus 1723 via an interface, such as a video adapter 1748. In addition to the monitor, computers can include or be connected to other peripheral devices (not shown), such as speakers and printers.

The computer 1720 may operate in a networked environment using logical connections to one or more remote computers, such as a remote computer 1749. The remote computer 1749 may be another computer, a server, a router, a network PC, a peer device or other common network node, and typically includes many or all of the elements described above relative to the computer 1720, although only a memory storage device 1750 has been illustrated in FIG. 17. The logical connections depicted in FIG. 17 include a network connection 1751, which can support a local area network (LAN) and/or a wide area network (WAN). Such networking environments are commonplace in offices, enterprise-wide computer networks, intranets and the Internet.

Computer 1720 includes a network interface 1753 to communicate with remote computer 1749 via network connection 1751. In a networked environment, program modules depicted relative to the computer 1720, or portions thereof, may be stored in the remote memory storage device. It will be appreciated that the network connections shown are exemplary and other means of establishing a communication link between the computers may be used.

In the foregoing description and in the accompanying drawings, specific terminology and drawing symbols are set forth to provide a thorough understanding of the present invention. In some instances, the terminology and symbols may imply specific details that are not required to practice the invention. For example, the wireless handheld devices discussed above are "smart phones" that support many services in addition to conventional voice functions. Portable computing devices such as tablet computers, e.g., an iPad manufactured by Apple, Inc. of Cupertino, Calif., and palm-top and lap-top computers, can be equipped as detailed herein to serve as wireless handheld devices. Moreover, some components or devices are shown directly connected to one another while others are shown connected via intermediate components, or wirelessly, e.g., Wi-Fi, Bluetooth, a public WAN, e.g., the Internet, or a cellular network. In each instance, the method of interconnection establishes some desired electrical or logical communication between two or more devices, as will be understood by those of skill in the art.

Server 101 may be realized as one or more servers, each including one or more elements shown within server 101, e.g., ranking rules 150, user database 155, and experiential database 160. Server 101 may also be implemented as discrete servers in which each includes a processor, memory, storage, and modules, self-contained within a server having discrete physical boundaries. In this embodiment, communications among the processor, memory, storage, and modules, occur internally. A discrete server may also be embodied virtually, e.g., via VMWARE, or VIRTUALBOX. Server 101 may also be implemented in a distributed fashion, e.g., via a "hypervisor" implementation such as VMWARE, or as individual "cloud" services, in which processor, memory, and storage are not necessarily physically co-extensive. For example, processors 145 may be distributed across several physical processors communicating over a local area network. In such implementations, memory 140 may be physically separate from processor 145 and databases 150, 155, and 160, requiring communication over a potentially insecure communication link. Some embodiments therefore support secure communication links and data encryption for the communications into and out of server 101. The components of server 101 may be distributed across local and wide-area networks, including the Internet, as will be readily understood by those of skill in the art.

Variations of these embodiments, including embodiments in which features are used separately or in any combination, will be obvious to those of ordinary skill in the art. Therefore, the spirit and scope of the appended claims should not be limited to the foregoing description. In U.S. applications, only those claims specifically reciting "means for" or "step for" should be construed in the manner required under 35 U.S.C. § 112(f).

What is claimed is:

1. A method for prioritizing customers to qualify for support, the method comprising:
   Maintaining a user database listing of at least a subset of the customers;
   Obtaining experiential information about the customers during customer access of a physical store;
   Ranking the customers responsive to the experiential information, the ranking collecting the customers in priority groups;
   Rendering a first view of the ranking, the first view depicting a priority of the customers along plural dimensions, the rendering of the first view comprising depicting visual representations of the priority groups as separated from a reference location by a respective distance and depicting visual representations of the customers in a given one of the priority groups at different angles with respect to the reference location;
   Conveying the first view to a user interface;
   Receiving a trigger indicative of activity of one of the customers; and
   Updating the user database responsive to the trigger.

2. The method of claim 1, further comprising updating the ranking of the one of the customers and rendering a second view of the updated ranking responsive to the trigger, the second view depicting the updated ranking with the one of the customers moved between ones of the priority groups.

3. The method of claim 1, wherein the angles are a function of customer-access time and customer location.

4. The method of claim 1, further comprising updating the ranking based on data in the user database.

5. The method of claim 1, wherein the activity of the one of the customers comprises physically shopping in the physical store at a geographical location.

6. The method of claim 5, wherein the first view represents regions within the geographical location along a first of the dimensions.

7. The method of claim 6, wherein the first view represents a duration of the one of the customers in at least one of the regions along a second of the dimensions.

8. The method of claim 1, wherein the activity of the one of the customers comprises interacting with a web page.

9. The method of claim 1, the rendering of the first view presenting the priority groups as nested shapes.

10. The method of claim 9, wherein the shapes are concentric.

11. The method of claim 1, wherein the trigger comprises a signal indicative of an email interaction by the one of the customers.

12. The method of claim 11, wherein the signal indicative of the email interaction identifies a status of an email message to the one of the customers.

13. The method of claim 12, further comprising updating the ranking of the one of the customers and rendering a second view of the updated ranking responsive to the status of the email message, the second view depicting the updated ranking with the one of the customers moved along at least one of the dimensions.

14. A system for prioritizing customers to qualify for support, the system comprising:
   At least one server having a user database listing at least a subset of the customers, and a ranking-rules database for ranking the customers, the at least one server configured to perform operations including:
   Ranking the customers, including an active customer, responsive to ranking-rules in the ranking-rules database;
   Rendering a first view of the customer ranking, the first view depicting a priority of the customers, including the active customer, along plural dimensions, wherein the first view collects the customers in priority groups, including depicting visual representations of the customers in a given one of the priority groups at different angles with respect to a reference location, and depicting the active customer in a first of the priority groups;
   Obtaining experiential information about the active customer during website or e-mail access by the active customer;
   Updating the ranking of the active customer responsive to the experiential information;
   Conveying to a user interface a second view of the customer ranking depicting the active customer in a second of the priority groups, such that the second priority group is closer than the first priority group to the reference location in the first and second views; and
   Updating the user database responsive to the experiential information about the active customer.

15. A method for prioritizing customers to qualify for support, the method comprising:
   Maintaining a user database listing at least a subset of the customers;
   Obtaining experiential information about the customers during the customers' interactions with a website or e-mail;
   Ranking the customers responsive to the experiential information, the ranking collecting the customers in priority groups;
   Rendering a first view of the ranking, the first view depicting a priority of the customers along plural spatial dimensions and representing the priority as a vector from a reference location;
   Conveying the first view to a user interface;
   Receiving a trigger indicative of activity of one of the customers; and
   Updating the user database responsive to the trigger.

* * * * *